July 14, 1942.  E. S. CEDARLEAF  2,289,344
TOOL
Filed April 28, 1941
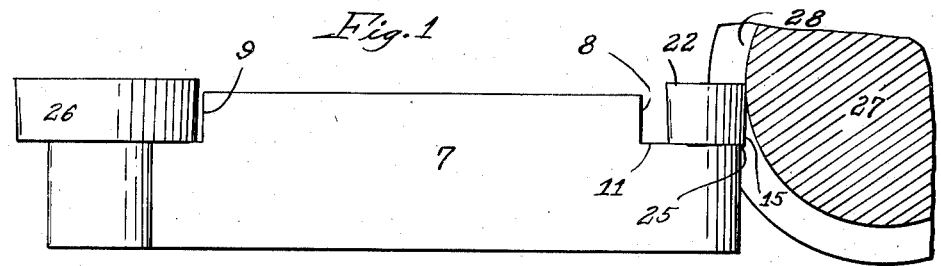
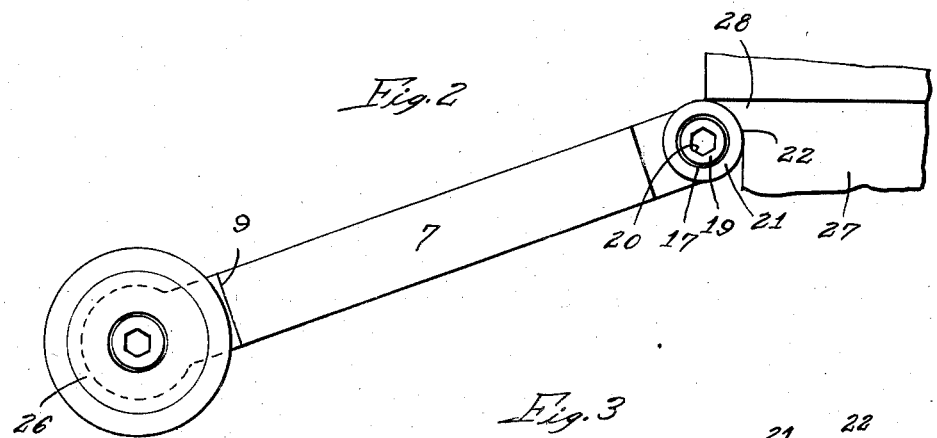
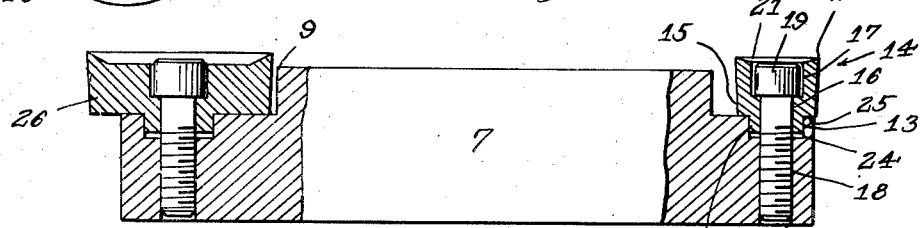
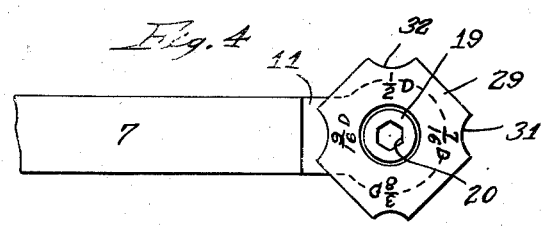
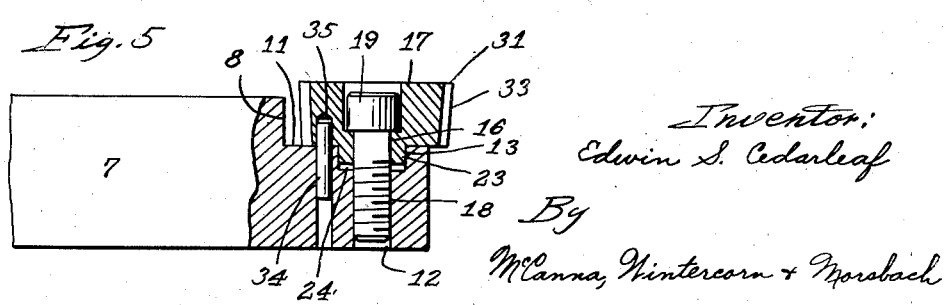
Inventor:
Edwin S. Cedarleaf
By
McCanna, Wintercorn & Morsbach
Attys.

Patented July 14, 1942

2,289,344

UNITED STATES PATENT OFFICE 2,289,344

TOOL

Edwin S. Cedarleaf, Rockford, Ill., assignor to Forest City Bit & Tool Co., Rockford, Ill., a corporation of Illinois Application April 28, 1941, Serial No. 390,732

5 Claims. (Cl. 29—102)

This invention relates to cutting tools of the broad class generally employed for metal cutting, and particularly adapted for turning operations.

An important object of the invention is the provision of a cutting tool of generally improved cutting characteristics having a novel combination of cutter and holder, whereby the cutter is held against a flat bearing seat on the holder with its periphery in spaced relation to the holder so that the holder may be progressively rotated through small angles to present new cutter areas to the work as the cutter becomes dull or wears away. Among other objects of the invention is the provision of a cutting tool arranged to support cutters of different shape for interchangeable use in conducting a succession of cutting operations, the cooperative relationship between the cutter and holder being such as to accommodate both male and female cutters.

Other objects and advantages will appear from the following discussion and the accompanying drawing, in which—

Figure 1 is a side elevation of a cutting tool embodying my invention showing one end of the tool in position against a work piece;

Fig. 2 is a plan view of Fig. 1;

Fig. 3 is a side view of the tool, the end portions thereof being in section;

Fig. 4 is a top view of a tool embodying the invention showing a female cutter, and Fig. 5 is a side view of the cutter shown in Figure 1, the end thereof being shown in section.

The invention contemplates a tool having a holder designated generally by the numeral 7, the holder in this instance having provision for the support of a cutter at each end thereof so that a single holder serves for the simultaneous support of a plurality of different cutters. Conveniently the opposite ends are arranged for the support of cutters of different sizes. The holder is in this instance of rectangular shape, being of substantially greater width than thickness and being adapted for reception in the conventional tool rest or similar tool supporting devices.

Each end of the holder or bar is provided with a recess as shown at 8 and 9 along the upper edge of the bar for the reception in the recesses of cutters, as will presently be described. These recesses are identical in nature and serve similar purposes, and consequently only one end portion of the tool will be described. The top surface 11 of the recess 8 is substantially plane and provides a bearing surface for the cutter. Positioned in this top surface and extending through the bar parallel with its sides and adjacent the end is a bore 12, the bore being internally threaded. Also in the surface 11 is a counterbore 13 coaxial with the bore 12 and extending a short distance down into the bar, as will be apparent from Figs. 3 and 5.

A cutter designated generally by the numeral 14 consists of a body portion 15 provided with a longitudinal bore 16 extending therethrough and a counterbore 17 on its top side, the bore 16 serving to snugly receive a threaded screw 18 engaging the internal threads of the bore 12 while the counterbore 17 receives the head 19 of the screw so that the head bears against the shoulder between the bore and the counterbore so as to secure the cutter to the holder. The screws are, in this instance, of the type having an angular socket 20 in its head for engagement by a wrench to insert and remove the same. The upper side of the cutter is also bushed as shown at 21 to provide a peripheral cutting edge 22 on the cutter. The counterbore 17 is enough larger than the head 19 of the screw to provide substantial clearance therebetween. The opposite side of the cutter is provided with a boss 23 received within the counterbore 13 within very close limits in its radial dimension, but allowing for a small amount of clearance between the bottom face of the boss and the bottom of the counterbore 13 as shown at 24. Thus it will be seen that the lower face 25 of the cutter is caused to abut and bear against the plane surface 11, and this lower face 25 is likewise finished to a plane surface, this contact taking the end thrust of the cutter in its operation against the work. Likewise the side surfaces of the boss 23 and the counterbore 13 take the side thrust bearing on the cutter incident to the cutting operations. It will be seen that this relieves the screw of any substantial thrust incident to the cutting operations, and its sole function is, therefore, to retain the cutter and the holder in their relative operative positions.

In the form of the invention shown in Figs. 1 to 3, inclusive, the opposite end of the holder likewise has a cutter 26 substantially identical to the cutter 14 except for its size, and the cutter is retained in position and functions in the same manner. In this embodiment the cutters 14 and 26 are circular cutters and the sides 15 of the body are tapered inward slightly from top to bottom so as to relieve the cutter from the work.

Attention is directed to the fact that the cutter is held in position on the holder and is supported thereon through the plane faces 11 and 25 and through the circular faces of the boss 23 and bore 13. It will also be seen that the cutting edge 22 is concentric with the faces of the boss 23 and the bore 13. Through this support structure it will be seen that the cutter is capable of rotation on the holder through any required degree of angularity, and because of the arrangement of the screw and the manner of support of the cutter this can be accomplished without disturbing the position of the work or the position of the holder in the tool post simply by loosening the screw and rotating the cutter. This is a matter of substantial importance in cutting a radius and eliminates the delicate, tedious and time-consuming operation of resetting the holder heretofore necessary in tools of this character. Thus, when the cutter is applied to a work piece as indicated at 27 so as to turn the arcuate shoulder 28, it is possible to maintain a substantially fixed curvature on the work by rotating the cutter through a small angularity as the edge 22 is worn down, thus presenting a new area of the cutter to the work in such fashion that the entire area of the cutting edge 22 can be used in successive increments before necessitating the sharpening of the cutter. This result is made possible by the manner in which the cutter is supported on the holder.

In Figs. 4 and 5 I have shown a modified form of the invention as applied to the use of female cutters. In this form of the invention the holder is likewise provided with a recess 8, surface 11, bore 12 and counterbore 13. In this instance the cutter consists of a rectangular body portion 29 having arcuate surfaces formed in its corner portions as indicated at 31, 32, etc., of different curvatures, the upper edges of these surfaces serving as the cutting edges of the cutter. The body portion 29 is sloped inwardly from top to bottom as shown at 33 for the purpose of relieving the cutter from the work. The cutter 29 likewise is provided with a bore 16 and counterbore 17 for the reception of the screw 18 and head 19, respectively, of the retaining screw. The bottom surface of the cutter is also provided with a shoulder 23 snugly received in the counterbore and relieved from the bottom of the counterbore as shown at 24. In this form of the invention the holder has a pin 34 projecting upwardly from the surface 11 adapted to be received in an opening 35 in the bottom of the cutter, the cutter having accurately positioned openings as shown at 35 in the four positions required for reception of the pin 34 so as to align the cutting edges and prevent rotation of the cutter about the screw 18 in response to lateral thrust against the cutting edges, thereby retaining the lateral cutter in fixed rotative position.

It will be seen that the latter form of the invention is substantially identical with that shown in Figs. 1 to 3 with the exception that means are provided for preventing rotation of the cutter with respect to the holder, this means being necessitated because of the form of the cutter involving as it does the application of an angular portion of the cutter against the work, which may under certain circumstances tend to produce rotation of the cutter.

It is believed that the foregoing conveys a disclosure of the principles of the invention such as to permit those skilled in the art to practice the same, and is given by way of illustration rather than limitation.

I claim:

1. The combination in a cutting tool of a tool holder comprising a bar shaped for reception in a tool rest, said holder having a threaded bore adjacent the end thereof, a counterbore coaxial with said bore and a plane surface around said counterbore at right angles to the axis thereof, a cutter comprising a body having a plane surface on one side to seat against the plane surface of said holder and a central cylindrical boss for close reception in the radial dimension in said counterbore, the opposite side of said body having a cutting edge at the periphery thereof, a central bore extending through the body and through said boss, and a counterbore, and a screw extending through the bore of said cutter and engaging the threaded bore of said holder, said screw having a head seated in the counterbore of said cutter to secure the cutter to the holder, said cutter overhanging the end of the holder, and the edges of said body tapering inwardly from said cutting edge through at least a portion of the periphery of the cutter.

2. The combination in a tool of a tool holder having a recess in one face at its end, a cylindrical threaded bore in said recess, a cylindrical counterbore coaxial with said bore and a plane surface around said counterbore at right angles to the axis thereof, a cutter having a central bore for the passage of a screw and counterbore on one side thereof for the reception of the head of said screw, the opposite side of said cutter having a cylindrical boss for close reception in the radial dimension in the counterbore of said holder and a plane face at right angles to the axis of said boss adapted to seat against the plane surface of said holder, and a screw extending through the bore of said cutter and engaging the threaded bore of the holder to screw the cutter to the holder.

3. The combination in a tool of a holder having a threaded bore in close proximity to the end thereof, a counterbore coaxial with said bore, and a plane surface around said counterbore at right angles to the axis thereof, a cutter comprising a body having a plane surface on one side to seat against the plane surface of said holder, and a central cylindrical boss for close reception in the radial dimension in said counterbore, the opposite side of said body having an upstanding cutting edge at the periphery thereof, a central bore extending through said body and said boss, and a counterbore, and a screw extending through the bore of said cutter and engaging the threaded bore of said holder, said screw having a head seated in the counterbore of said cutter to secure the cutter to the holder, the edges of said body tapering inwardly from said cutting edge and overhanging the end of said holder.

4. The combination in a cutting tool of a tool holder comprising a bar shaped for reception in a tool rest, said holder having a threaded bore adjacent the end thereof, a counterbore coaxial with said bore and a plane surface around said counterbore at right angles to the axis thereof, a cutter comprising a body having a surface on one side to seat against the plane surface of said holder, and a central cylindrical boss for close reception in the radial dimension in said counterbore, the edge portion of said body having recesses defining cutting edges on the opposite side of said body, said opposite side having a central bore extending through the body and through said boss, and a counterbore, a screw extending through the bore of said cutter and engaging the threaded bore of said holder, said screw having a head seated in the counterbore of said cutter to secure the cutter to said holder, and means acting between said holder and said cutter for preventing rotation of the cutter with respect to the holder under cutting pressure, the edge portions of said body tapering inwardly from said cutting edges to relieve the body from the work.

5. The combination in a radius cutting tool of a body having a boss projecting from one side thereof provided with an accurately shaped cylindrical outer surface and a plane surface surrounding said boss at right angles thereto, said cylindrical surface and said plane surface forming locating elements therefor, the opposite side of said body having an upstanding cutting edge at the periphery thereof, a central bore extending through said boss and a counterbore for the reception of a screw for securing the cutter to a holder.

EDWIN S. CEDARLEAF.